(12) United States Patent
Elnozahy et al.

(10) Patent No.: US 6,792,459 B2
(45) Date of Patent: Sep. 14, 2004

(54) VERIFICATION OF SERVICE LEVEL AGREEMENT CONTRACTS IN A CLIENT SERVER ENVIRONMENT

(75) Inventors: Elmootazbellah Nabil Elnozahy, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 09/736,573

(22) Filed: Dec. 14, 2000

(65) Prior Publication Data

US 2002/0077836 A1 Jun. 20, 2002

(51) Int. Cl.[7] .............................................. G06F 15/173
(52) U.S. Cl. ....................... 709/224; 709/202; 709/203; 709/204; 709/206; 709/217; 709/218; 709/223; 709/226; 709/228; 709/229; 709/230; 709/236; 370/241; 370/252; 370/335; 370/338; 370/352; 379/22; 455/423; 455/456; 705/11; 705/14; 705/1
(58) Field of Search .................................. 709/203, 224

(56) References Cited

U.S. PATENT DOCUMENTS

| | | | |
|---|---|---|---|
| 5,956,709 A | | 9/1999 | Xue ................................ 707/3 |
| 6,006,260 A | * | 12/1999 | Barrick et al. ............... 709/224 |
| 6,041,041 A | * | 3/2000 | Ramanathan et al. ........ 370/241 |
| 6,058,102 A | * | 5/2000 | Drysdale et al. ............. 370/252 |
| 6,157,618 A | * | 12/2000 | Boss et al. ................... 370/252 |
| 6,321,205 B1 | * | 11/2001 | Eder .............................. 705/7 |

* cited by examiner

Primary Examiner—Hosain Alam
Assistant Examiner—Young Won
(74) Attorney, Agent, or Firm—Casimer K. Salys; Anthony V. S. England

(57) ABSTRACT

A method, apparatus and computer program product are disclosed to enable independent verification of service level agreement between two parties. In one embodiment, a first party contracts the hosting service of a second party to provide said first party with Web page and services on second party's equipment. Said contract contains a Service Level Agreement specifying performance parameters and guarantees for the response time experienced by users of said Web page and services. Independent verification by a third party of said agreement is done for a fee through several steps. In a first step, said third party inserts measuring and reporting instructions into blocks of information maintained on the server of said second party. The measuring instructions are for delivery to the client with the blocks of information. The delivery of the instructions occurs responsive to a request for the information by the client. Once they are delivered, the instructions are executed by the client. This client-side execution produces a measure of service that is provided to the client by the network and the server. In another step, reporting instructions are inserted into the blocks of information. Like the measuring instructions, the reporting instructions are also for delivery to the client. The reporting instructions may be in just one of the blocks of information, and their delivery also occurs responsive to a request for the information by the client. As a result of being executed by the client, the reporting instructions cause the client to send a report of the measure to a verifying agent.

30 Claims, 7 Drawing Sheets

VERIFICATION OF SERVICE LEVEL AGREEMENT CONTRACTS IN A CLIENT SERVER ENVIRONMENT

CROSS-REFERENCE TO RELATED APPLICATION

"Measuring Response Time for a Computer Accessing Information From a Network", application Ser. No. 09/736,348.

BACKGROUND OF THE INVENTION

1. Field of the invention

This invention concerns verifying Service Level Agreement (SLA) compliance in Internet service provider environments. More specifically, in one embodiment the invention describes a system where an independent agent, for a fee, verifies the SLA contract compliance between first and second parties, where the first party pays a fee to the second party in return for the second party hosting the first party's Internet presence with specified and/or guaranteed performance parameters.

2. Description of the Related Art

Businesses are increasingly moving their Internet presence and even their internal operations to Internet Service Providers (ISP's) or Application Service Providers (ASP's). An ISP or ASP, herein called service provider without any loss of generality, operates Internet Data Centers (IDC's) to support the clients' Web presence and transactions. Under this model, a service provider offers a service with the equipment, software, system management and network connections to enable a business to conduct some of its operations, such as business-to-business auctions, customer relations, advertising, financial transactions, etc., over the Internet. This relieves businesses, especially small ones, from the burden of operating their own home-based Web sites, and allows more economy of scale at IDC's through consolidation of resources to provide more cost effective operation.

A Service Level Agreement (SLA) contract between a business and a service provider typically stipulates that in return for a fee, the service provider will guarantee that certain performance parameters will be satisfied, such as maximum service down time and user-perceived response time to the business's Web Site. However, it is difficult, at best, for the business to verify that the performance parameters are met or that the service provider complies with the terms of the SLA. A business typically contracts a third party company to conduct independent verification of the service provider's compliance with the SLA.

The current art is to have the independent verifier deploy periodic polling of the Web site's services, and thus generate an approximation of the response time perceived by actual customers. There are drawbacks to this polling scheme for several reasons, among which are accuracy; difficulty of covering the possible range of equipment that clients use; an increased load on the Web server due to the polling traffic; and difficulty of ensuring accurate or complete geographic coverage. A service provider may also argue that the methods deployed by the third party are not representative of the customers' experience, and therefore are not relevant to the SLA. Additionally, polling can often interfere with embedded Web caches, further distorting the accuracy of the measurements. Furthermore, some services may be cumbersome to measure by polling or fictitious requests (e.g. financial transactions).

An alternative to polling is to have the service provider measure the time it takes each request to execute at the server site, excluding the network effects. Service providers provide this information to their customers. This measurement, however, does not include the network interactions, or the effects of Web caches and proxies, and thus does not represent accurately the customer's perceived response time. For instance, such a measurement does not point to potential problems within the network (e.g. the need for faster Internet connection). Additionally, it does not provide any mechanism to verify the service provider's claims.

Therefore, there is a need for an independent verifier to produce a tally of the actual user's perceived response time of actual requests. By measuring the actual response time the independent verifier avoids all the pitfalls mentioned above, and provides an accurate picture of the level of service provider's SLA compliance. This picture takes into account not only server-side latency, but also network performance, so that the response time measurement reflects latency experienced by a client system accessing information on the WWW.

SUMMARY

In one embodiment of the present invention, a level of service received by a client from a service provider is verified in a number of steps. In a first step, a business contracts an independent third party to verify the SLA between said business and a service provider that implements the business's Internet presence. In a second step, the independent verifier processes and modifies the contents of the business's Web site to attach measuring and reporting instructions to blocks of information available on the site (e.g. Instructions are added to HTML documents, Java applets, etc.). In a third step, the measuring and reporting instructions are transparently shipped to a Web client in association with the blocks of information. The delivery of the instructions occurs in response to a request for the information by the client. Once they are delivered, the instructions are transparently executed by the client to measure and report the response time. This client-side execution produces an accurate measure of service that is provided to the client by the network and the server. In a fourth step, the reporting instructions cause the client to transparently send a report of the service measure to the verifying agent. All these steps are performed in a transparent manner to the client so as to not interfere with the service, and do not pose any appreciable overhead on the service provider's resources, unlike with existing art (e.g. Polling). Furthermore, this method provides an accurate measurement of the actual response time, including both time to execute the request at the server and the network delay.

The measuring aspect, according to an embodiment, includes response time for delivering one of the blocks of information to the client, numerous instances of delivering blocks of information to the client, or statistics about the response times, such as average, maximum and minimum times, variance, etc.

The reporting aspect has a number of embodiments. In one, reporting could be triggered upon the client unloading one of the blocks of information. In another, the reporting could be triggered at least partly from a certain type of request by the client, such as for a block of information that does not have any of the inserted instructions, or for a block that is not on the server. In another, the reporting is triggered only when the measured service response time violates a specified performance level. In one alternative, the reporting is triggered at least partly by an accumulation of a certain threshold number of response times. Alternatively, passage of a time or date causes, or at least contributes to causing, the reporting. Also, in one embodiment the reporting is related to an identity of the client.

In a further sending related aspect, in an embodiment the report includes HyperText Transfer Protocol formatting for sending to a server of the verifying agent.

In another form, an embodiment includes a processor connected a network. A storage device is connected to the processor and the network for storing; i) a program to control the processor and ii) blocks of information. The storage device is also for storing measuring instructions and reporting instructions attached to the blocks of information for executing by the client to measure service provided to the client by the service provider, and to send a report of the measure from the client to a verifying agent. Furthermore, the processor is operable with the program to deliver some information blocks, the measuring instructions, and the reporting instructions to the client via the network, responsive to a request by the client.

In another form, an embodiment includes a computer program product in a computer readable media for use in a data processing system. The computer program product includes measuring instructions attached to blocks of information for maintaining on a server. The server is for coupling to a client via a network. The measuring instructions are for: i) delivering to the client in association with ones of the blocks of information, responsive to a request by the client, and ii) executing by the client to measure service provided to the client by the network and the server. The computer program product also includes reporting instructions attached to the blocks of information. The reporting instructions are for: i) delivering to the client in association with ones of the blocks of information, responsive to a request by the client, and ii) executing by the client to send a report of the measure from the client to a verifying agent.

It is an advantage of the invention that performance of both the host server and the network are verified in a thorough and objective way that does not add substantially to traffic on the server or network, and does not interfere with the user's experience. These and other advantages of the invention will be further apparent from the following drawings and detailed description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
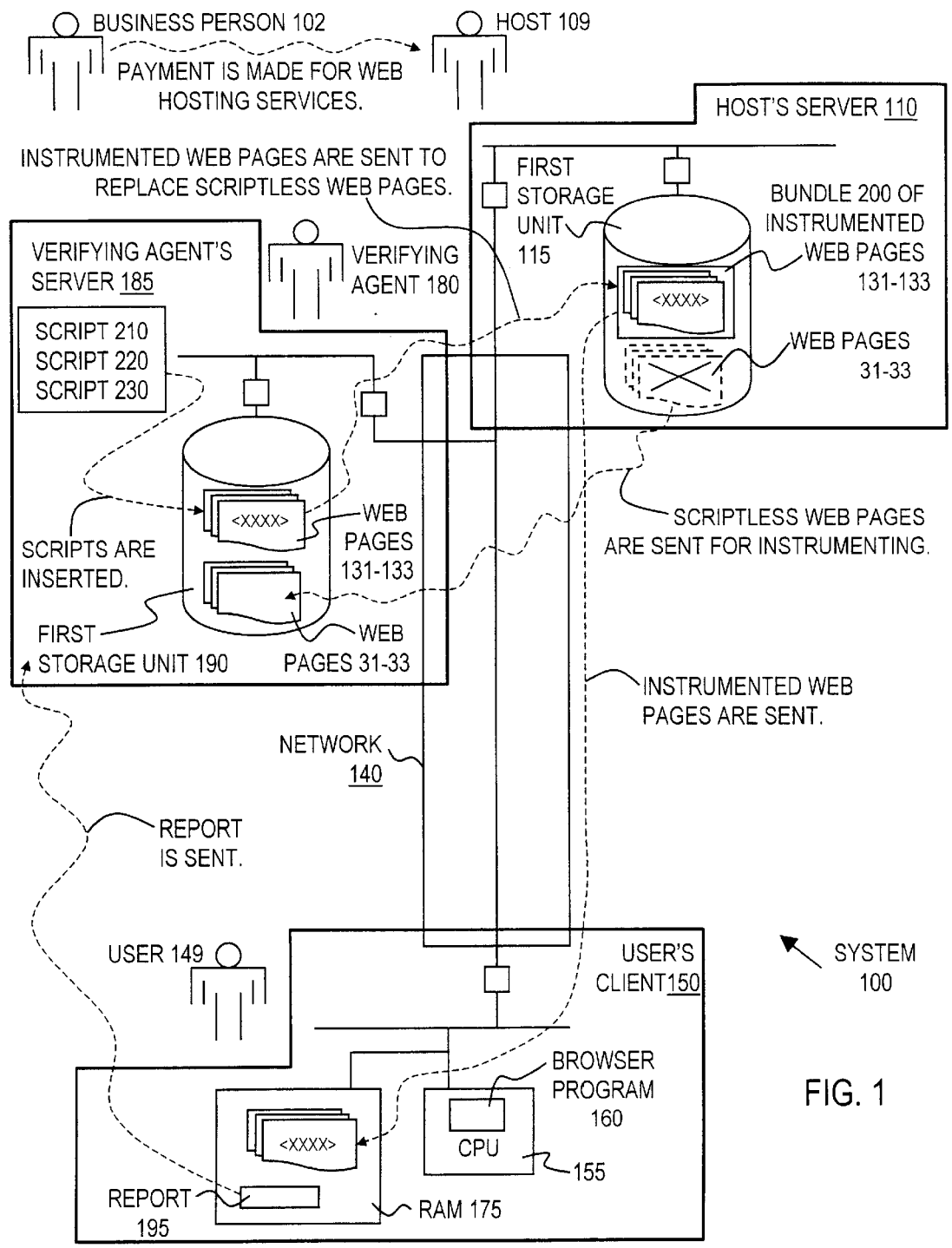
FIG. 1 shows a system structure and how it relates to interactions among a business person, Web site host, user and verifying agent, according to an embodiment of the invention.

In the following detailed description of the preferred embodiments, reference is made to the accompanying drawings illustrating embodiments in which the invention may be practiced. It should be understood that other embodiments may be utilized and changes may be made without departing from the scope of the present invention.

The following terminology and features of Hypertext Markup Language (HTML), version 4.01, are important to an understanding of the present embodiment. An HTML page can contain embedded client-side scripts which are executed as the page is parsed by the browser. Alternatively, the scripts may be in a file or files separate from but referenced in the HTML page. (Script parsing can be deferred by a browser only if the "defer" attribute of the SCRIPT tag is set true. In its absence, scripts are parsed as they are encountered.) Furthermore, HTML link elements can contain a script snippet instead of a URL. When a link containing a script snippet is dereferenced, the script is executed.

The following paraphrases the HTML 4.01 standard:

A client-side script is a program that may accompany an HTML document or be embedded directly in it. The script executes on the client's machine. Authors may attach a script to a HTML document such that it gets executed every time a specific event occurs, such as, for example, when the user activates a link. Such scripts may be assigned to a number of elements via the intrinsic event attributes. Script support in HTML is independent of the scripting language.

Javascript is one example of a widely used scripting language that is supported by Netscape's Navigator and Microsoft's Internet Explorer browsers.

HTML 4.01 also specifies several intrinsic events and the interfaces through which client-side scripts can be invoked when different events occur. Two specific events that can invoke a script attached to a document are:

onload( ): In the context of a document, the onload handler is triggered when a document and its embedded elements have been fully loaded. In addition, Javascript provides an onload handler for IMAGE objects that is triggered when the image has been fully loaded.

onunload( ): Triggered when a document is about to be unloaded to make room for a new document, or when the browser is being closed.

The following terms are specific to the present embodiment and are used herein.

A bundle is a set of web pages that have been instrumented to measure client-perceived response times. The verifier instruments the Web pages to insert necessary measuring and reporting instructions. These may be HTML or non-HTML pages, and could be static files or dynamically generated content. The HTML pages in the bundle may contain links to each other, enabling users to traverse the bundle by dereferencing hyperlinks. There can be two kinds of links: instrumented and uninstrumented. An instrumented link points to a page whose response time we want to measure when the link is dereferenced. An uninstrumented link points to a page whose response time is not interesting. This distinction allows for flexibility in the measurements. For example, "hot" or frequently accessed Web pages may be instrumented, while pages that are only accessed under special circumstances may be omitted.

Users arrive at a specific page within a bundle in one of two ways, causing it to be loaded in their browser. First, the user may have dereferenced an instrumented link from another page within the bundle. This an instrumented entry into the page. Alternatively, they may have directly entered the page's URL into the browser, through the browser's bookmark, or may have followed a link from a page not within the bundle. This is an outside entry into the page.

According to one of the embodiments, a third party verifier, for a fee, processes and modifies the contents of the Web page for the purpose of measurement and reporting. All links for which the response time is to be measured are instrumented. Thus, there is a degree of flexibility inherent in this invention, in which the overhead of measurement and reporting can be tailored according to customer's needs. The third party, for a fee, can also insert code to add instrumentation to dynamically generated pages as desired.

The response time is determined for all instrumented entries to HTML pages in the bundle. Furthermore, the present embodiment also provides a scheme to determine the response time of all images contained within an HTML page. The embodiment includes i) a time keeping aspect, which concerns reading time related data at certain instants and using the data to compute elapsed times, i.e., response time samples, and ii) a "librarian" aspect, which concerns storage and retrieval of the data according to a well-defined interface. These actions are carried out using the above described HTML events and scripts. That is, time keeping uses the two intrinsic HTML events, onload and onunload and the feature permitting a script to be invoked when a link is activated. Every web page in the instrumented bundle is set up such that a timekeeper script is invoked when a user clicks on a link.

Referring first to FIG. 1, system 100 is shown according to an embodiment of the invention. A business person 102 is shown to represent a person or business association having an interest in a Web site. The term "Web site" refers to blocks of information formatted in a conventional HTML format, commonly referred to as "Web pages," and maintained on the server of a host 109, accessible to users via conventional Hyper Text Transfer Protocol over the Internet. The "Internet" is shown here as a network 140. One typical user 149 is shown. The user 149 accesses the network 140 by a computer system referred to herein as the "user's client" 150.

A portion of the host's server 110 is shown, including first storage unit 115, which originally has web pages 31 through 33 stored therein. In accordance with the embodiment, these pages are sent to verifying agent 180, so that the pages 31–33 can be "instrumented" by the agent 180, using the verifying agent's server 185, a portion of which is shown. To instrument the pages 31–33, verifying agent's server 185 inserts scripts 210, 220 and 230, or at least reference thereto, into these web pages 31–33. (Herein reference to a script "attached to" a page, is meant to include both the case of the script itself being inserted in the page, and the case of a reference to the script being included in the page, so that while the script itself is not included in the page, the script is nevertheless called by the reference.)

Server 185 then sends the pages 131–133, which have the scripts 210–230 attached, back to the host's server 110 for replacing the web pages in storage unit 115, as shown. These web pages 131–133 are all part of the same bundle 200 of pages which the verifying agent's server 185 has instrumented. That is, to each one of a number of uninstrumented pages 31, 32 and 33 that the host server 110 originally had stored, respective references to first script 210, second script 220 and third script 230 have been added to create the bundle 200 of instrumented pages 131, 132 and 133.

At least the first time a user 149 requests one of the instrumented pages 131–133, the scripts associated with the page are also delivered to the user's client 150. Once delivered, the scripts 210–230 are executed by the client 150 responsive to certain events. As a result of this client-side execution, a measure is produced by the client 150 of service provided to the client 150 by the network 140 and the server 110, and a report 195 is sent to the verifying agent's server 185. In alternative embodiments, the report 195 may be sent to the host server 110 or the business 102.

Figure 2:
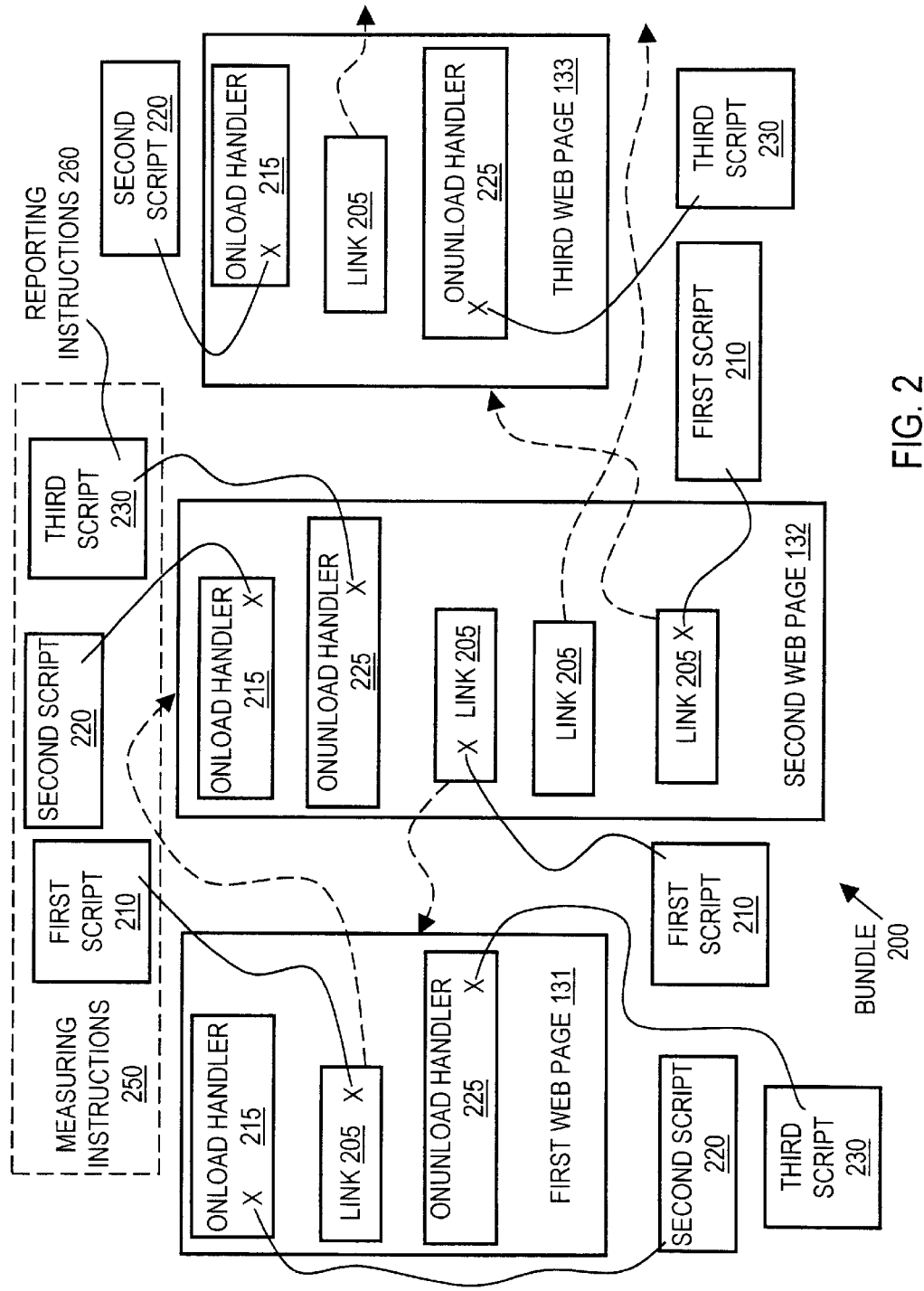
FIG. 2 shows a bundle of web pages, according to an embodiment of the invention.

Referring now to FIG. 2, bundle 200 of first, second and third web pages, 131, 132 and 133 are shown. In particular, an instrumented link 205 is shown on first web page 131, with an associated first script 210. Likewise, each of the other pages 132 and 133 have links 205 to web pages. Each one of the links 205 that references one of the web pages in the bundle 200 has a reference to the first script 210. Note that the second and third web pages 132 and 133 each have a link 205 which does not reference one of the pages in the bundle, so these links do not reference first script 210. Note also, the second web page 132 has two links 205 that reference other pages in the bundle, so page 132 has two references to the first script 210. Likewise, each of the pages 131, 132 and 133 of the bundle 200 has a second script 220 included in its respective onload handler 215. (The script 220 may constitute the entire script for the handler 215, or it may be included with some other handler-related script, so reference is made herein to the script 220 being included in or associated with the onload handler 215 to encompass both possibilities.) In similar fashion, each of the pages 131 through 133 has reference to third script 230 included in its respective onunload handler 225. (Similarly, the script 230 may constitute the entire script for the handler 225, or it may be included with some other handler-related script, so reference is made herein to the script 230 being included in or associated with the onload handler 225 to encompass both possibilities.)

The first script 210 and second script 220 include instructions for measuring a response time. Likewise, in various embodiments, the third script 230 includes instructions which aggregate response times, or calculate statistics about response times. Thus, a set of the scripts 210, 220 and 230, associated with loading and unloading page 132, is shown in FIG. 2 as "measuring instructions" 250. The third script 230 includes instructions for generating reports, so script 230 is also shown in FIG. 2 as "reporting instructions" 260.

It should be understood that although numerous instances of the scripts 210, 220 and 230 are shown, this may be merely figurative. In a preferred embodiment, only one instance of each script actually exists for bundle 200. That is, the scripts may be in separate files stored on the server 110, and each one is delivered to the client the first time the client receives a page, such as page 131, which references the script. Moreover, it should be understood that all the scripts may even be in one file. Herein, reference to a first script 210, second script 220, etc. should be understood to include reference to a first function, second function, etc., where the functions may all be defined in a single script file.

Figure 3:
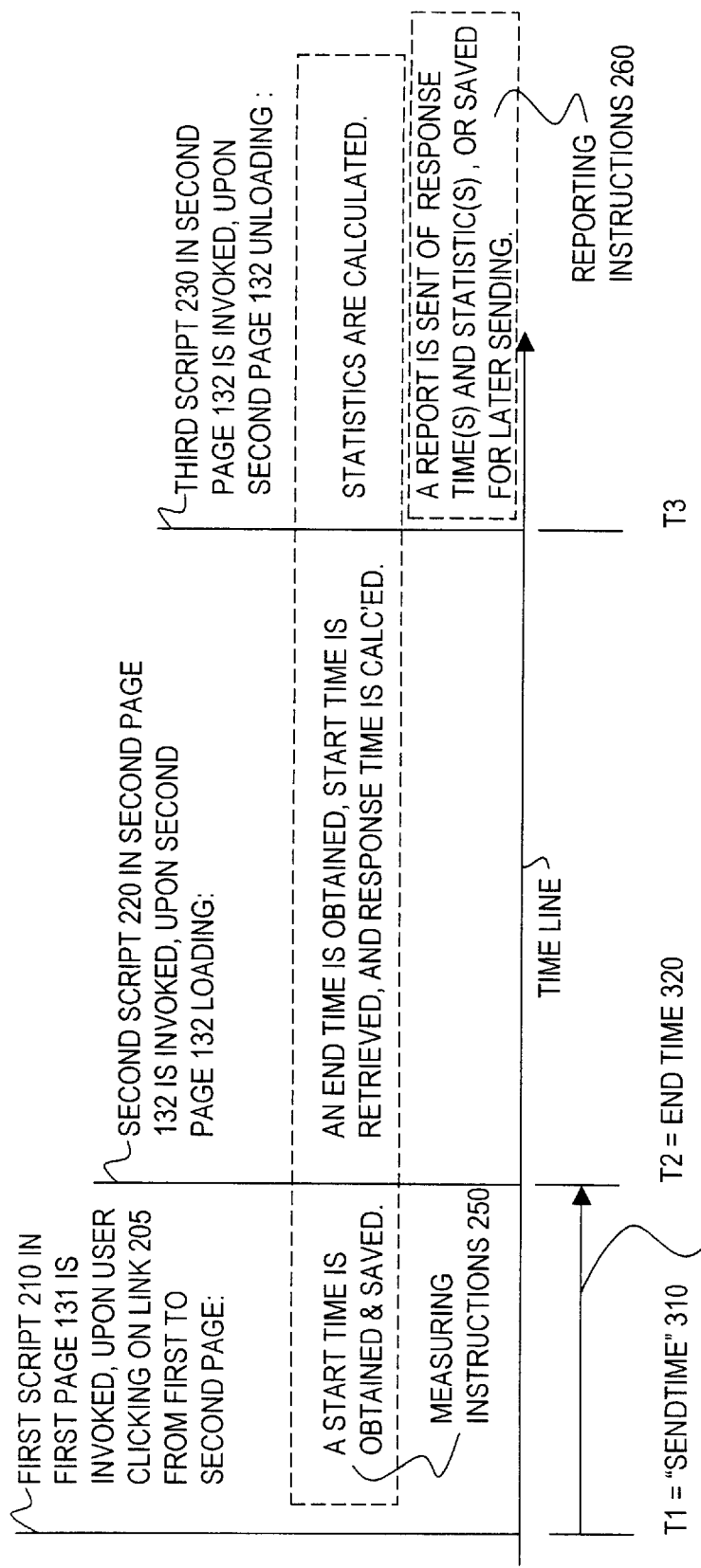
FIG. 3 illustrates an example of events invoking measuring instructions for computing of a response time, and invoking reporting instructions for sending a report.

Referring now to FIG. 3, and also with reference to FIG. 2, an example is illustrated. In the first page 131, the link 205 links the page 131 to the second web page 132. At time t1, shown in FIG. 3, when a user clicks on the link 205 in web page 131, the browser program 160 (FIG. 1) begins executing the associated first script 210. The script 210 directs the browser program 160 (FIG. 1) to determine the current time and record it as a "sendtime." Then normal browser action dereferences the link 205, loading the second web page 132. (This recorded first reference time is also referred to herein as a "start time," or a "starting time.")

Next, at time t2, responsive to the second page 132 being fully loaded by the browser 160, the second script 220 for the second page 132 begins executing. The script 220 directs the browser program 160 (FIG. 1) to get the current time, retrieve the sendtime, and calculate the response time, that is, the difference between the current time and the "sendtime." (This second reference time is also herein referred to as an "end" or "ending" or "now" time.)

Following the loading of second instrumented page 132, the page is eventually unloaded at time t3, either by the user directing the browser to load another page or to close the browser window. If the instrumented second page 132 is unloaded responsive to the user clicking on a link therein to another instrumented page, that is, responsive to an instrumented entry back to the first page 131 or to third page 133, then, the browser 160 (FIG. 1) begins executing the first script 210 again, in association with a link 205 in the second page 132, to calculate another instance of a response time (not shown in FIG. 3).

If the second page is unloaded in a way that is not an instrumented entry, that is, due to the user either: i) directly typing a URL, instead of clicking a link, ii) closing the browser window, or iii) clicking a link to a page not in the bundle 200, then neither of the first scripts 210 on the second page 132 are invoked and no new response time is calculated. However, the third script 230 associated with the second page 132 onunload handler 225 is invoked, and performs other steps as shown in FIG. 3, which may include sending a report of the response time now, or accumulating the response time with others previously calculated, for sending later, and may also include computing statistics for the response times for sending either now or later. These steps will be discussed further hereinbelow, but first, the following describes how distinctions are made in the various types of unloading.

As stated above, an issue arises calling for different steps in response to different ways of unloading a page. Conventional HTML specifications stipulate that if a currently loaded document has an onunload event handler specified, that handler must be invoked before the new document is loaded. The onunload handler is also invoked if the user closes the browser window. Thus, the onunload handler may be invoked regardless of whether a document is being unloaded for an instrumented entry or some due to some other action. However, the third script 230 is associated with the onunload handler 225 for each page 131–133 in the bundle 200, and unless some distinction is made, the script 230 will be executed for each invocation of the onunload handler 225, regardless of the context. Therefore, a distinction must be made among the various circumstances of invocations of the onunload handler 225.

This distinction is made in the present embodiment by including in the first script 210 instructions for setting a variable "cleanup" in the window object, and including instructions in the third script 230 for checking the variable. According to this embodiment, responsive to the user clicking on the link 205 in the first page 131, which initiates loading of the second page 132, the variable "cleanup" is set. The variable is then checked by third script 230 in the first page 131. That is, responsive to the requested first page 131 unloading the third script 230 begins execution. The browser program 160 checks whether variable "cleanup" is set in the window object. If the variable is found to be set, this indicates that the current page, that is first page 131, is being displaced to make room for another instrumented page in the bundle, and another response time is calculated. In one of the embodiments, wherein response times are reported upon exiting the bundle 200, no report is generated if the variable is set, however, if the variable is found not set, further steps in the third script 230 are performed to generate a report.

In one embodiment, sending a report 195 includes the third script 230 causing the browser 160 to open a web page with a special URL. That is, the third script 230 composes a special URL that includes response times appended to the Internet name of the verifying agent server 185, or host server 110, or whatever server is to receive the report 195. Next, the script 230 causes the newly composed URL to be loaded in a "communication" window of the browser display. The verifying agent server 185 is set up such that it extracts the data from the URL and responds to the client 150 with a page that closes the window. Closing is done by delivering a page containing an onload="self.close( )" tag in the BODY element.

To mitigate the undesirable effect on user 149 of the communication window being opened as a separate window on the desktop, the communication window can be made small. However, the window cannot be made invisible without the Universal Browser Write privilege being granted. The privilege granting process involves the user and is generally obtrusive. Preferably, therefore, the same hidden frame 411 that is used to save sendtimes 310, as described in the related patent application, is used as the communication window.

Figure 4:
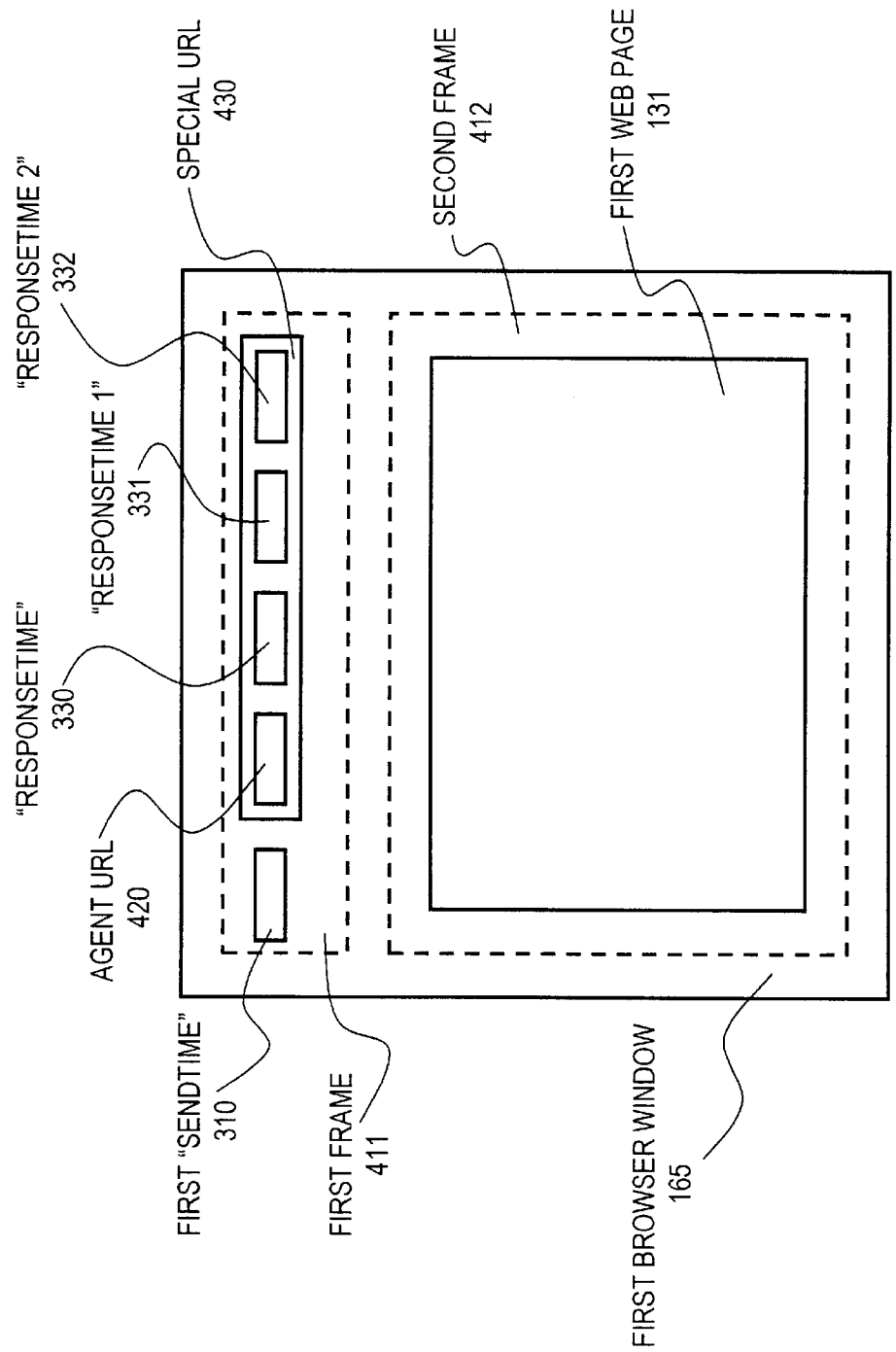
FIG. 4 illustrates recording a response time in a frame of a browser window, in accordance with an embodiment of the invention.

Referring now to FIG. 4, the hidden frame 411 is shown. According to this embodiment, each instrumented web page, such as the first web page 131, has a corresponding frameset document. The frameset document definition in the page causes the browser to divide the browser window 165 into two frames, responsive to loading the instrumented page 131. As shown in FIG. 4, first frame 411 is used to save sendtime 310 and responsetime 330, and the second frame 412 is for displaying the web page 131. The first frame is set to zero size and is therefore not visible to the user. According to this alternative, visiting the instrumented site through a browser window causes the following actions to take place. On the first outside entry to an instrumented page, the Javascript actions of Table Two of the cross-referenced patent application cause the corresponding frameset document to be loaded. As long as the user makes instrumented entries to the other pages in the bundle, the hidden, response time frame 411 stays in the top-level browser window. This hidden frame needs to be reloaded only if the user makes an uninstrumented entry to a page in the bundle.

In another embodiment, which is suitable if the client 150 browser has cookies enabled and the host 110 is the receiver of the report 195, the script 230 causes the response time to be saved in a cookie for transmission at a later date. The host server 110 causes the cookie to expire as soon as a request carrying the cookie is sent to the host server 110, so that the cookie is not sent out on future requests. (Due to Javascript security restrictions that control script cookie access, the host server 110 (and not any agent on the WWW) must be the one that receives the response time samples in this case.

Figure 5:
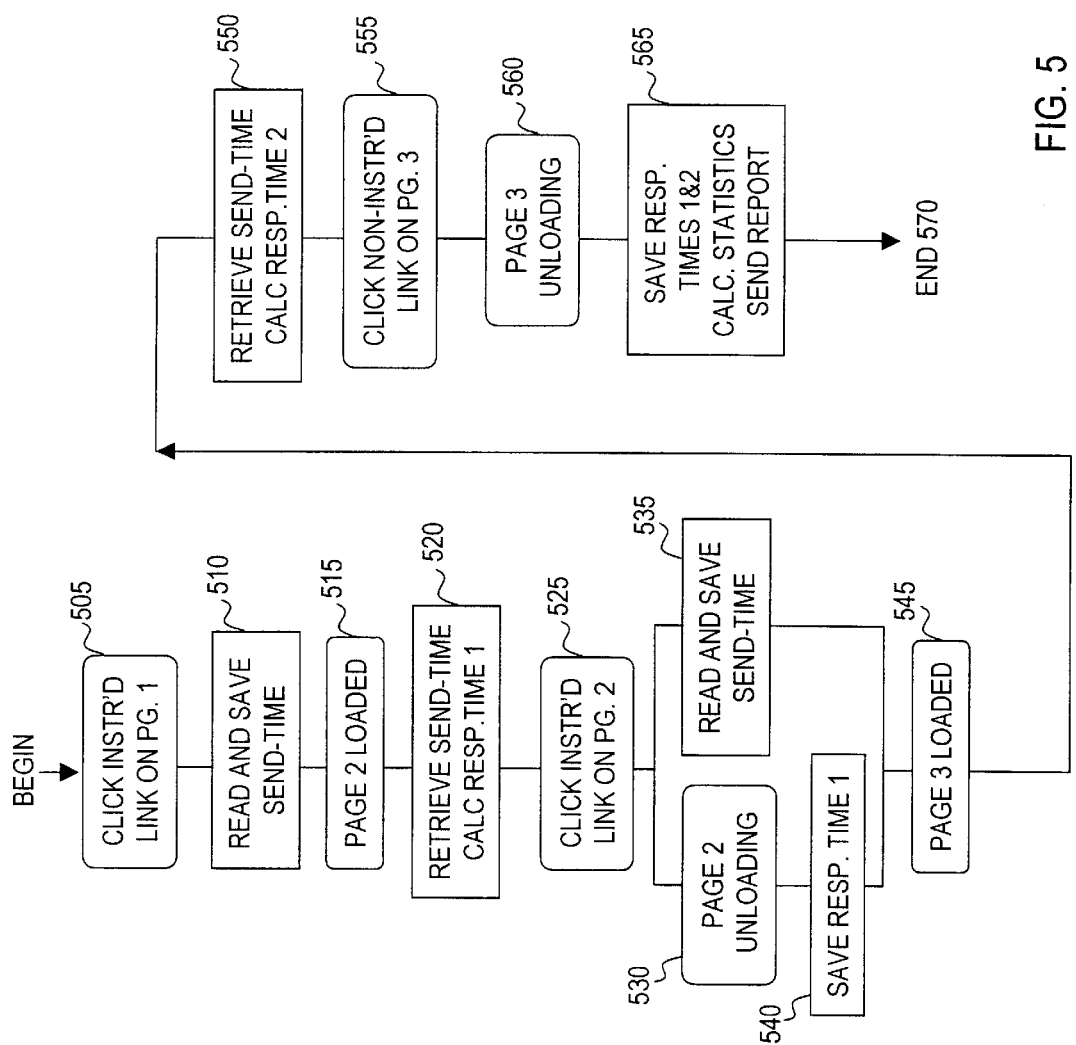
FIG. 5 is a flow chart illustrating method steps for measuring numerous instances of response times, calculating statistics for the response times and sending a report, according to an embodiment of the invention.

Referring now to FIG. 5 a flow chart is shown illustrating method steps for measuring numerous instances of response times, calculating statistics for the response times and sending a report, according to an embodiment of the invention. In step 505, a user clicks on a first link in a first page of a bundle. The link references to a second page in the bundle. In step 510, first script 210 reads the current time and saves it as a sendtime. At step 515, the second page is loaded, which invokes second script 220 referenced in the second page, resulting in retrieving the sendtime, reading a new current time, and calculating a response time, at step 520.

Next, at step 525, the user clicks on a link in the second page which references to a third page in the bundle. First script 210, associated with the link in the second page, executes at step 535 to read another current time and save it as a new sendtime. Also, before the third page is loaded, the second page begins unloading at 530, and the second page's onunload handler is invoked, including third script 230, which causes the first calculated response time to be saved at 540, such as in a hidden frame, as described hereinabove.

Next, at step 545, the third page is loaded, which triggers the onload handler for the third page, including second script 220, and retrieves the sendtime that was saved in step 535. Also, the script 220 reads a new current time and uses it and the sendtime to calculate a second response time, that is, the response time for the time to load the third page.

Next, at 560, the user clicks on a non-instrumented link in the third page, that is, a link to a page that is not in the current bundle. This causes the third page to begin unloading, so the third page's onunload handler is invoked, including third script 230, which causes the both the second calculated response time to also be saved, and also causes statistics about the response times to be calculated at step 565. For example, the average of the saved response times is calculated in one embodiment. Particularly in situations where there are more than two response times, other statistics are calculated in embodiments of the invention. In one embodiment the longest and shortest response times are determined, as well as the variance of all the times. Also at step 565, according to this illustrated embodiment, a report is sent due to the third page unloading in connection with the user having clicked on a link to a page outside the bundle. Next, the steps of the present embodiment end at step 570.

Figure 6:
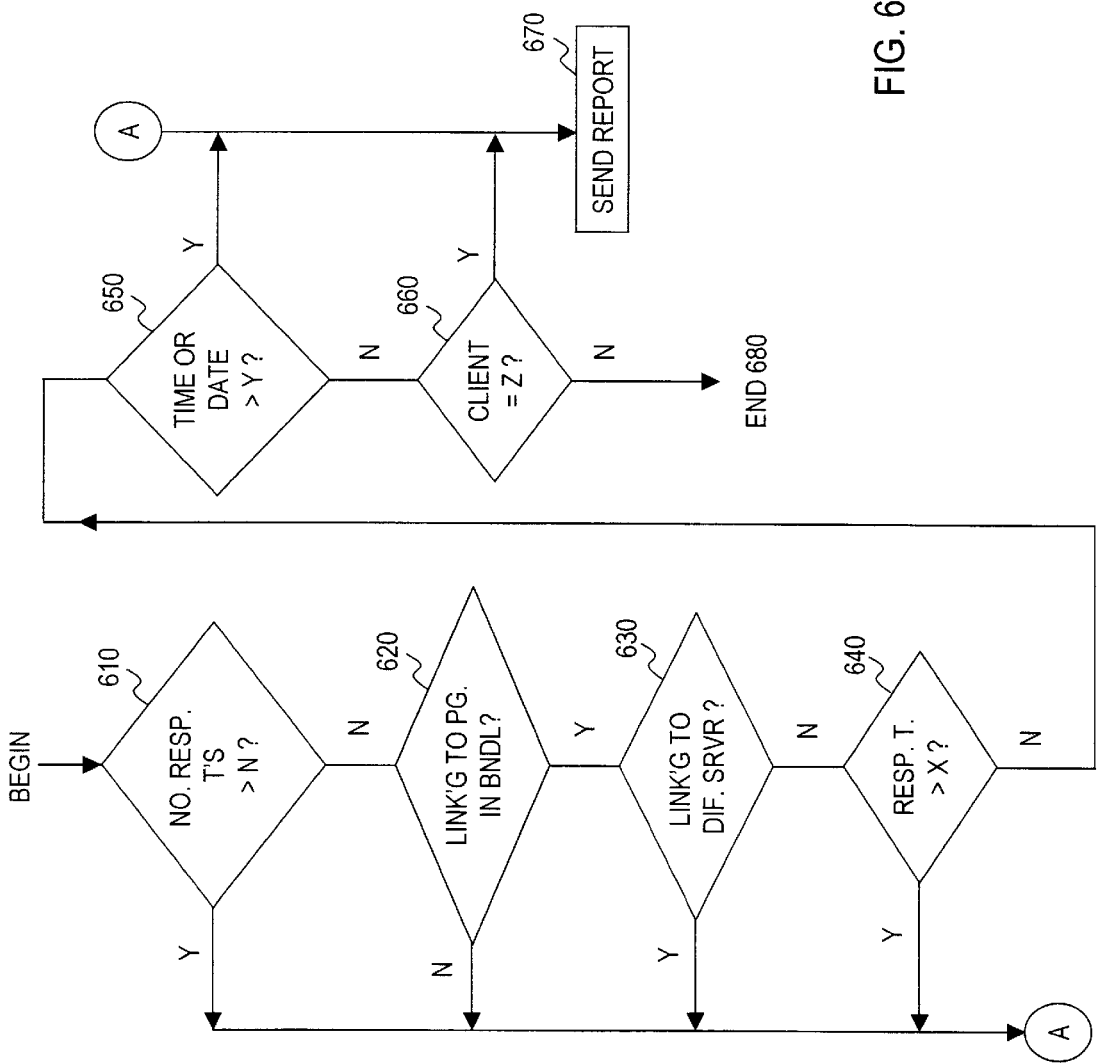
FIG. 6 is a flow chart illustrating method steps for determining when to send a report, according to an embodiment of the invention.

Referring now to FIG. 6 a flow chart is shown illustrating method steps for one of the third scripts 230 determining when to send a report, according to an embodiment of the invention. In step 610, a determination is made whether the number of response times exceeds some number n. If yes, then the method proceeds to step 670, and a report is sent.

If no, the method proceeds to step 620, and a determination is made whether the script 230 has been invoked in connection with the client linking to a page that is in the bundle. If no, then the method proceeds to step 670, and a report is sent.

If yes, the method proceeds to step 630, and a determination is made whether the script 230 has been invoked in connection with the client linking to a page stored on a different server. If yes, then the method proceeds to step 670, and a report is sent.

If no, the method proceeds to step 640, and a determination is made whether the most recent response time exceeds a threshold value X. If yes, then the method proceeds to step 670, and a report is sent.

If no, the method proceeds to step 650, and a determination is made whether the current time and date exceed a preset time or date Y. If yes, then the method proceeds to step 670, and a report is sent.

If no, the method proceeds to step 660, and a determination is made whether the client has an identity Z. If yes, then the method proceeds to step 670, and a report is sent. If no, then the method ends at step 680.

In a further sending related aspect, it should be understood that the report may be HyperText Transfer Protocol formatted for convenience of sending to the server 185 of the verifying agent via the Internet.

Figure 7:
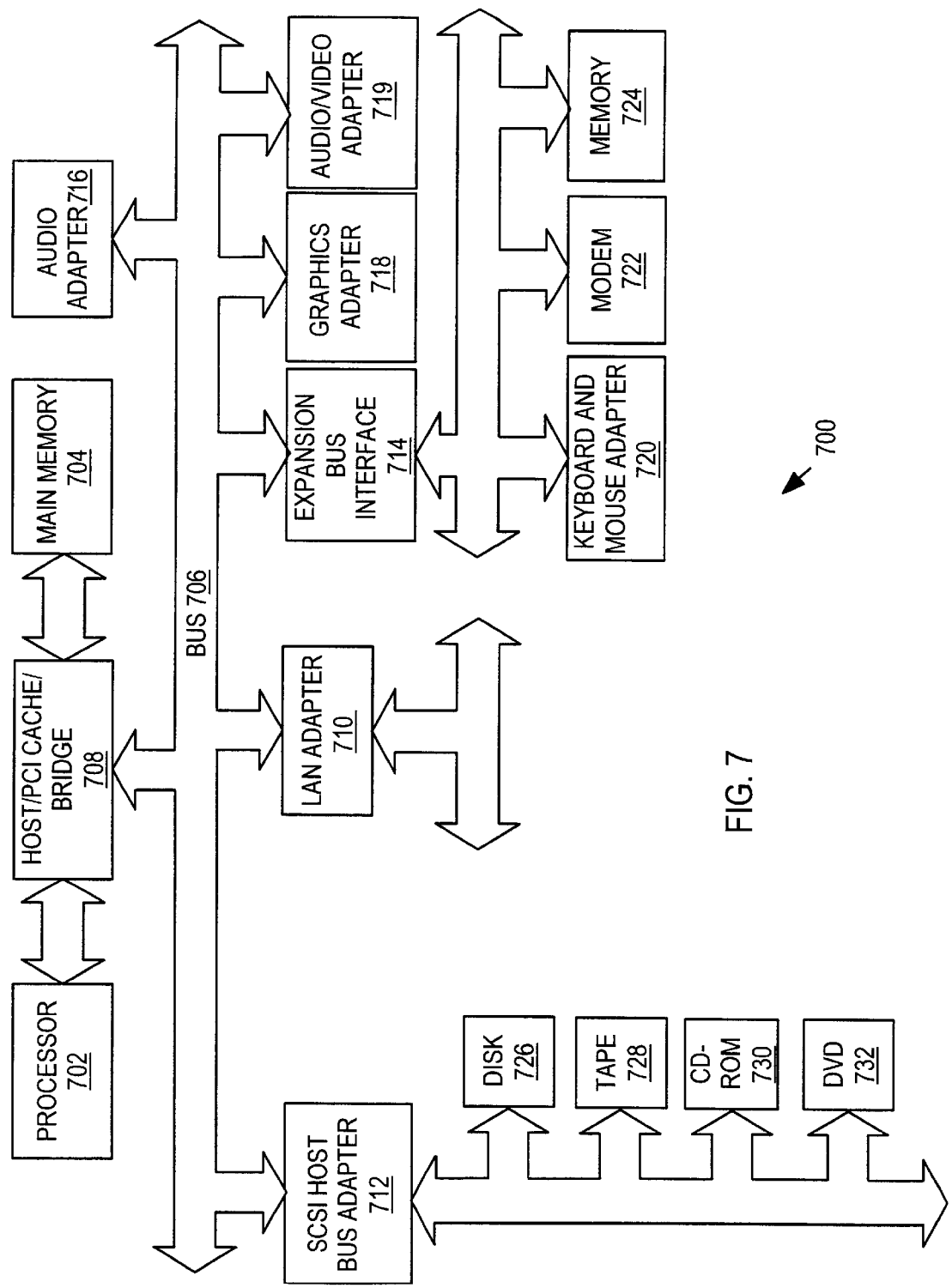
FIG. 7 is a block diagram of a data processing system according to an embodiment of the invention.

With reference now to FIG. 7, a block diagram of a data processing system 700 is illustrated. Instances of this system 700 are generally applicable for the systems shown in FIG. 1, namely, host's server 110, user's client 150 and the verifying agent's server 185. Data processing system 700 employs a peripheral component interconnect (PCI) local bus architecture. Although the depicted example employs a PCI bus, other bus architectures, such as Micro Channel and ISA, may be used. Processor 702 and main memory 704 are connected to PCI local bus 706 through PCI bridge 708. PCI bridge 708 may also include an integrated memory controller and cache memory for processor 702. Additional connections to PCI local bus 706 may be made through direct component interconnection or through add-in boards. In the depicted example, local area network (LAN) adapter 710, SCSI host bus adapter 712, and expansion bus interface 714 are connected to PCI local bus 706 by direct component connection. In contrast, audio adapter 716, graphics adapter 718, and audio/video adapter (A/V) 719 are connected to PCI local bus 706 by add-in boards inserted into expansion slots. Expansion bus interface 714 provides a connection for a keyboard and mouse adapter 720, modem 722, and additional memory 724. In the depicted example, SCSI host bus adapter 712 provides a connection for hard disk drive 726, tape drive 728, CD-ROM drive 730, and digital video disc read only memory drive (DVD-ROM) 732. Typical PCI local bus implementations will support three or four PCI expansion slots or add-in connectors.

An operating system runs on processor 702 and is used to coordinate and provide control of various components within data processing system 700 in FIG. 7. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 700. Instructions for the operating system, the object-oriented operating system, and applications or programs are located on a storage device, such as hard disk drive 726, and may be loaded into main memory 704 for execution by processor 702.

Those of ordinary skill in the art will appreciate that the hardware in FIG. 7 may vary depending on the implementation. For example, other peripheral devices, such as optical disk drives and the like, may be used in addition to or in place of the hardware depicted in FIG. 7. The depicted example is not meant to imply architectural limitations with respect to the present invention. For example, the processes of the present invention may be applied to multiprocessor data processing systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

It should be understood from the foregoing, that it is a particular advantage of the invention that performance of both the host server and the network are verified in a thorough and objective way that does not add substantially to traffic on the server or network, and does not interfere with the user's experience.

The description of the present embodiment has been presented for purposes of illustration, but is not intended to be exhaustive or to limit the invention to the form disclosed. Many modifications and variations will be apparent to those of ordinary skill in the art. For example, it should be understood that while FIG. 6 shows an embodiment where any one of numerous conditions or events may trigger a report, it would be within the spirit and scope of the invention to encompass an embodiment wherein a report is triggered only upon occurrence of more than one of the events or conditions. Even occurrence of numerous ones of the events or conditions may be required before a report is sent in one embodiment. Likewise, in one embodiment of the invention, a report is sent every time a response time is calculated.

To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention.

What is claimed is:

1. A method for verifying a level of service received by a client from a server and network, comprising the steps of:
   attaching measuring instructions to blocks of information maintained on a server, wherein the measuring instructions are for executing by the client to measure service provided to the client by the network and the server; and
   attaching reporting instructions to the blocks of information, wherein the reporting instructions are for executing by the client to send a report of the measure of service from the client to a verifying agent, wherein the server is capable of being coupled to a client via a network for delivering ones of the blocks of information, the measuring instructions and the reporting instructions to the client via the network responsive to a request by the client, wherein the blocks of information have links for activating, and wherein the attaching of the measuring instructions includes:
   attaching first instructions to selected ones of the links of a first one of the blocks so that the selected ones of the links are instrumented for measurement, wherein responsive to the activating of such an instrumented ones of the links normal browser action on the client dereferences the activated, instrumented link to load a second one of the blocks, and wherein the first instructions are for executing responsive to the activation of the instrumented ones of the links; and
   attaching second instructions to an onload handler of the second block, wherein the second instructions are for executing in response to the client loading the second block.

2. The method of claim 1, wherein the measuring comprises measuring a response time for delivering one of the blocks of information to the client.

3. The method of claim 1, wherein the measuring comprises measuring n response times for n instances of delivering ones of the blocks of information to the client.

4. The method of claim 1, wherein the measuring comprises measuring statistics about the n response times.

5. The method of claim 1, wherein the verifying agent includes the host.

6. The method of claim 1, wherein the verifying agent includes a third party.

7. The method of claim 1, wherein the sending of the report is responsive to accumulating m response times.

8. The method claim 1, wherein the sending of the report is responsive to a certain type of request by the client.

9. The method of claim 8, wherein the certain type of request comprises a request for a block of information that does not have any of the attached instructions.

10. The method of claim 8, wherein the certain type of request comprises a request for a block of information that is not on the server.

11. The method of claim 1, wherein the attaching of the reporting instructions to the blocks includes:
   attaching third instructions to an onunload handler of the second block, wherein the third instructions are for executing in response to unloading the second block.

12. The method of claim 1, wherein the sending of the report is responsive to a date or time of day.

13. The method of claim 1, wherein the sending comprises sending the report in a Hypertext Transfer Protocol format to a server of the verifying agent.

14. The method of claim 1, wherein the sending of the report is responsive to the service violating specified level.

15. The method of claim 1, wherein the sending of the report is responsive to an identity of the client.

16. An apparatus for verifying a level of service received by a client from a server and network, comprising:
   a processor connected to a network;
   a storage device connected to the processor and the network, wherein the storage device is for storing:
      a program for controlling the processor;
      blocks of information;
      measuring instructions attached to the blocks of information for executing by the client to measure service provided to the client by the network and the server; and
      reporting instructions attached to the blocks of information for executing by the client to send a report of the measure from the client to a verifying agent;
   wherein the processor is operative with the program to deliver ones of the blocks of information, the measuring instructions, and the reporting instructions to the client via the network, responsive to a request by the client, wherein the blocks of information have links for activating, and wherein the attaching of the measuring instructions includes:
      first instructions attached to selected ones of the links of the first block so that the selected ones of the links are instrumented for measurement, wherein responsive to the activating of such an instrumented one of the links normal browser action on the client dereferences the activated, instrumented link to load a second one of the blocks, and wherein the first instructions are for executing responsive to the activation of the instrumented one of the links; and
      second instructions attached to an onload handler of the second block, wherein the second instructions are for executing in response to the client loading the second block.

17. A computer program product in a computer readable media for use in a data processing system for verifying a level of service received by a client from a server and network, the computer program product comprising:
  measuring instruction attached to blocks of information for maintaining on a server, wherein the measuring instructions are for executing by the client to measure service provided to the client by the network and the server; and
  reporting instructions attached to the blocks of information, wherein the reporting instructions are for executing by the client to send a report of the measure of service from the client to a verifying agent, wherein the server is capable of being coupled to a client via a network for delivering ones of the blocks of information, the measuring instructions and the reporting instructions to the client via the network responsive to a request by the client, wherein the blocks of information have links for activating, and wherein the attaching of the measuring instructions includes:
    first instruction attached to selected ones of the links of a first one of the blocks so that the selected ones of the links are instrumented for measurement, wherein responsive to the activating of such an instrumented ones of the links normal browser action on the client dereferences the activated, instrumented link to load a second one of the blocks, and wherein the first instructions are for executing responsive to the activation of the instrumented ones of the links; and
    second instructions attached to an onload handler of the second block, wherein the second instructions are for executing in response to the client loading the second block.

18. The computer program product of claim 17, wherein the measuring instructions comprise instructions for measuring a response time for delivering one of the blocks of information to the client.

19. The computer program product of claim 17, wherein the measuring instructions comprise instructions for measuring n response times for n instances of delivering ones of the blocks of information to the client.

20. The computer program product of claim 17, wherein the measuring instructions comprise instructions for measuring statistics about the n response times.

21. The computer program product of claim 17, wherein the reporting instructions include instructions for the report to be sent responsive to accumulating m response times.

22. The computer program product of claim 17, wherein the reporting instructions include instructions for the report to be sent responsive to a certain type of request by the client.

23. The computer program product of claim 22, wherein the certain type of request comprises a request for a block of information that does not have any of the inserted instructions.

24. The computer program product of claim 22, wherein the certain type of request comprises a request for a block of information that is not on the server.

25. The computer program product of claim 17, wherein the reporting instructions include:
  third instructions attached to an onunload handler of the second block, wherein the third instructions are for executing in response to unloading the second block.

26. The computer program product of claim 17, wherein the reporting instructions include instructions for the report to be sent responsive to the service violating a specified level.

27. The computer program product of claim 17, wherein the reporting instructions include instructions for the report to be sent responsive to an identity of the client.

28. The computer program product of claim 17, wherein the reporting instructions include instructions for the report to be sent responsive to a date or time of day.

29. The computer program product of claim 17, wherein the reporting instructions include instructions for the report to be sent in a HyperText Transfer Protocol format to a server of the verifying agent.

30. A method for verifying a level of service received by a client from a server and network, comprising the steps of:
  engaging, by a business having an interest in a web site, a verifying agent to verify a level of service provided by a service provider to the business, wherein the level of service relates to hosting the web site;
  processing content of the web site by the verifying agent, including attaching measuring and reporting instructions to blocks of information included in the web site, wherein the instructions are for executing by the client to measure and send a report of service provided to the client by the network and the server, wherein the server is capable of being coupled to a client via a network for delivering ones of the blocks of information, the measuring instructions and the reporting instructions to the client via the network responsive to a request by the client, wherein the blocks of information have links for activating, and wherein measuring instructions include:
    first instructions attached to selected ones of the links of a first one of the blocks so that the selected ones of the links are instrumented for measurement, where n responsive to the activating of such an instrumented ones of the links normal browser action on the client dereferences the activated, instrumented link to load a second one of the blocks, and wherein the first instructions are for executing responsive to the activation of the instrumented ones of the links; and
    second instructions attached to an onload handler of the second block, wherein the second instructions are for executing in response to the client loading the second block.

* * * * *

UNITED STATES PATENT AND TRADEMARK OFFICE
CERTIFICATE OF CORRECTION

PATENT NO. : 6,792,459 B2
DATED : September 14, 2004
INVENTOR(S) : Elnozahy et al.

It is certified that error appears in the above-identified patent and that said Letters Patent is hereby corrected as shown below:

Column 13,
Line 21, please delete "instruction" and replace it with -- instructions --;

Column 14,
Line 43, please delete "where n" and replace it with -- wherein --.

Signed and Sealed this

Twenty-fifth Day of January, 2005

JON W. DUDAS
*Director of the United States Patent and Trademark Office*